US010879540B2

(12) United States Patent
Luo et al.

(10) Patent No.: US 10,879,540 B2
(45) Date of Patent: Dec. 29, 2020

(54) LAYERED STRUCTURE BATTERY WITH MULTI-FUNCTIONAL ELECTROLYTE

(71) Applicant: Nano and Advanced Materials Institute Limited, Hong Kong (HK)

(72) Inventors: Hui Luo, Hong Kong (HK); Sara Abouali, Hong Kong (HK); Tao Xu, Hong Kong (HK); Li Fu, Hong Kong (HK); Soon Yee Liew, Hong Kong (HK); Yuechen Wang, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 147 days.

(21) Appl. No.: 16/207,221

(22) Filed: Dec. 3, 2018

(65) Prior Publication Data

US 2019/0173099 A1 Jun. 6, 2019

Related U.S. Application Data

(60) Provisional application No. 62/708,076, filed on Dec. 4, 2017.

(51) Int. Cl.

| | |
|---|---|
| ***H01M 6/40*** | (2006.01) |
| ***H01M 2/02*** | (2006.01) |
| ***H01M 4/08*** | (2006.01) |
| ***H01M 4/58*** | (2010.01) |
| ***H01M 4/62*** | (2006.01) |
| ***H01M 4/48*** | (2010.01) |

(52) U.S. Cl.

CPC ........... *H01M 6/40* (2013.01); *H01M 2/0207* (2013.01); *H01M 2/0275* (2013.01); *H01M 4/08* (2013.01); *H01M 4/48* (2013.01); *H01M 4/582* (2013.01); *H01M 4/625* (2013.01)

(58) Field of Classification Search

CPC ........ H01M 6/40; H01M 4/582; H01M 4/625; H01M 4/48; H01M 2/0207; H01M 4/08; H01M 2/0275

See application file for complete search history.

(56) References Cited

U.S. PATENT DOCUMENTS

| | | | | |
|---|---|---|---|---|
| 8,574,742 | B2 | 11/2013 | Zhang et al. | |
| 2005/0181275 | A1* | 8/2005 | Jang | H01M 6/12 429/188 |
| 2014/0099528 | A1* | 4/2014 | Lockett | C07D 233/58 429/124 |
| 2015/0079450 | A1* | 3/2015 | Wensley | H01M 2/145 429/144 |
| 2016/0260953 | A1* | 9/2016 | Lim | H01M 2/26 |
| 2019/0252690 | A1* | 8/2019 | Miles | H01M 10/0404 |

FOREIGN PATENT DOCUMENTS

| | | |
|---|---|---|
| EP | 0902737 B9 | 3/1999 |

* cited by examiner

*Primary Examiner* — Muhammad S Siddiquee

(74) *Attorney, Agent, or Firm* — Idea Intellectual Limited; Margaret A. Burke; Sam T. Yip

(57) ABSTRACT

The present invention provides a thin, bendable, printed, layered primary battery structure without a battery separator. The battery includes a first layer including a printed positive electrode. A second layer includes a negative electrode material which may be a printed negative electrode or a metal foil negative electrode. An adhesive, UV-curable intermediate layer is adhered to the first layer on a first side of the intermediate layer and is adhered to the second layer on a second side of the intermediate layer. The intermediate layer includes a water-soluble electroactive material and a water-soluble viscosity-regulating polymer in an amount sufficient to render the intermediate layer adhesive. The intermediate layer also includes a water-insoluble polymer matrix having sufficient rigidity to prevent contact of the first layer and the second layer. A flexible package encases the first, second, and intermediate layers.

13 Claims, 3 Drawing Sheets

LAYERED STRUCTURE BATTERY WITH MULTI-FUNCTIONAL ELECTROLYTE

CROSS-REFERENCE TO RELATED APPLICATIONS

This application claims priority from a U.S. Provisional Patent Application Ser. No. 62/708,076 filed Dec. 4, 2017, and the disclosure of which is incorporated herein by reference in its entirety.

FIELD OF THE INVENTION

The present invention related to thin, printable, and bendable batteries and, more particularly to thin, printable batteries that include a solid electrolyte and no separator between the cathode and the anode.

BACKGROUND OF THE INVENTION

The boost of wearable electronics has driven the demand of flexible battery as their power supply. As the most suitable candidate, thin film and printed batteries are vastly explored from aspects of materials, fabrication techniques and imprint processes; to product design, integration feasibility and coordinate methodology. As one most important power source, primary battery plays significant role as power supply in the application of disposable electronic devices and gadgets.

To create thin, flexible batteries, various printing-based production techniques have been explored. However, these prior art approaches still use a conventional battery structure, one that includes a separator between an anode and a cathode. Separators are required to prevent electrical contact between the anode and the cathode, creating a short circuit in the battery.

U.S. Pat. No. 8,574,742 describes a printed battery. In the '742 printed battery, an anode and a cathode are printed on either side of a separator. Thus, a separator is still required in this battery, and the separator is not a printed element. EP 0 902 737 describes a thin battery using printed structures. In this battery, a liquid electrolyte is used; this electrolyte is contained in a porous separator layer where the separator may be a filter paper, plastic membrane, cellulose membrane, or cloth. The use of conventional separators may increase battery thickness while the use of liquid electrolytes may be prone to leakage in a highly flexible and bendable battery structure such as would be required in a wearable battery.

Thus, there is a need in the art for improved printed battery structures, particularly improved battery structures that replace conventional separator paper by solid electrolyte to prevent short-circuiting the positive and negative electrodes and electrolyte leakage. Such a printed battery structure could be used to make thin, flexible, and bendable batteries.

SUMMARY OF THE INVENTION

The present invention provides a thin, bendable, printed, layered primary battery structure without a battery separator. The battery includes a first layer including a printed positive electrode. A second layer includes a negative electrode material which may be a printed negative electrode or a metal foil negative electrode. An adhesive, UV-curable intermediate layer is adhered to the first layer on a first side of the intermediate layer and is adhered to the second layer on a second side of the intermediate layer. The intermediate layer includes a water-soluble electroactive material and a water-soluble viscosity-regulating polymer in an amount sufficient to render the intermediate layer adhesive. The intermediate layer also includes a water-insoluble polymer matrix having sufficient rigidity to prevent contact of the first layer and the second layer. A flexible package encases the first, second, and intermediate layers.

In another aspect, the present invention provides a method for making a thin, bendable, printed, layered primary battery structure without a battery separator. A first electrode which is the positive electrode material is printed on a portion of a flexible package material laminated with current collector in advance. An intermediate layer is printed on the first electrode and is UV-cured. A second layer of a negative layer is provided on a portion of the flexible package. The negative electrode may be printed on flexible package material laminated with current collector or laminated with foil material directly. The intermediate layer is printed on the negative electrode and is UV cured. The intermediate layer is a mixture of a water-soluble electroactive material, the water-soluble viscosity-regulating polymer, a photoinitiator, and a precursor material to form the water-insoluble polymer matrix. The two intermediate layer portions are adhered to each other to form a single intermediate layer. Thus, the battery structure of positive electrode, intermediate layer, and negative electrode is formed.

DETAILED DESCRIPTION

Figure 1:
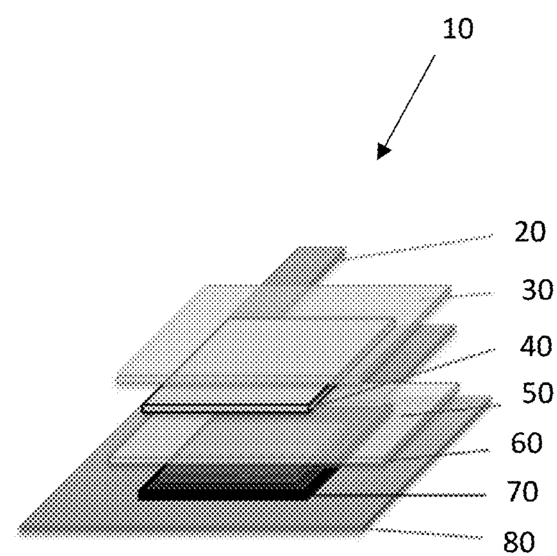
FIG. 1 schematically depicts the structure of a thin, flexible battery according to the present invention.

Turning to FIG. 1, a thin, bendable, printed battery 10 is depicted. Since printing technology is applied to form the batteries of the invention, the fabrication process is largely simplified as some steps in conventional electrode manufacturing are eliminated, e.g. cutting, stacking, aligning layers. Further, printing technology enables flexible layer design for the battery, so that it can be easily integrated with printed electronic devices as their power source. Importantly, battery 10 does not include a separator between the positive and negative electrodes. The battery 10 is a primary battery that includes a top flexible package portion 30, an electric terminal 20, and anode/negative electrode 40, an adhesive, multifunctional, intermediate layer 50, a positive electrode/cathode 60, an optional current collector layer 70, and a bottom flexible package portion 80.

The flexible package portions 30 and 80 may be any flexible packaging material, preferably one that is moisture proof and optionally heat-sealable. PET may be used as the flexible package material. In one embodiment, the anode/negative electrode 40 is printed on the flexible package portion 30. Optionally the printed anode/negative electrode is a zinc-based ink using a zinc-based powder in a binder material. The zinc-based powder may be a zinc-based alloy including bismuth, aluminum, and indium or a mixture of zinc powders and other materials such as bismuth, aluminum, and indium. Conductive carbon may also be included with the zinc-based ink. The conductive carbon may be graphene, graphite, carbon black, or acetylene black. As an alternative to printing a zinc-based ink, a zinc-based foil may be laminated to the flexible packaging portion 20.

The positive electrode/cathode 60 is printed onto the flexible package portion 80. Any known primary cathode paste/ink material may be used as the positive electrode 60. In one embodiment, the cathode paste ink may be a manganese oxide ($MnO_2$)-based paste. Optionally, a carbon-based current collector layer 70 may be printed on the package 80 prior to the cathode layer.

Various other combinations of anode/cathode materials may also be used in the batteries of the present invention. For example, iron oxide/nickel oxide systems may be employed or silver oxide/zinc systems may be used.

Various printing techniques may be used for form the cathode and anode layers. These include screen printing, stencil printing, inkjet printing or doctor blade techniques.

On both of the anode layer 40 and the cathode layer 60, a multifunctional, intermediate layer 50 is formed. The intermediate layer 50 eliminates the need for a separator layer because it has sufficient mechanical rigidity to prevent the anode 40 from contacting the cathode 60. Additionally, intermediate layer 50 includes an electroactive substance that can function as an electrolyte. To be discussed in further detail below, the precursors of the intermediate layer include a photoinitiator that facilitates UV curing of the intermediate layer. The intermediate layer is also an adhesive material, such that the portion of the intermediate layer on the anode and the portion of the intermediate layer on the cathode are adhered to each other, creating a unitary structure of anode/intermediate layer/cathode that is sealed within the flexible package portions 20 and 80. The sealing may be by press sealing, hot sealing, ultrasonic welding, or lamination.

Batteries supply energy by converting chemical energy into electricity and are classified into two categories based on the electrolyte applied: "wet" cells refer to the cells with electrolyte in a liquid form that can flow throughout the whole cell; "dry" cells typically use a solid/powdery electrolyte. The present invention intermediate layer 50 uses electroactive materials that provides the required ionic conductivity of an electrolyte, but at the same time maintains includes an electrically insulating polymer matrix with sufficient mechanical strength to prevent the cathode and anode from short-circuiting. The intermediate layer 50 is a mixture of a water-soluble electroactive material, a water-soluble viscosity-regulating polymer or a mixture of water-soluble viscosity-regulating polymers, a photo-initiator, and a precursor material to form a water-insoluble polymer matrix. The intermediate layer mixture is coated on either or both the negative or positive electrode and after UV or visible light irradiation forms a water-insoluble polymeric network which trap the water-soluble electroactive material in a gel-like layer so that there is no free flowing liquid inside the battery package.

The intermediate layer 50 includes a water-soluble electroactive material. In some embodiments, the water-soluble electroactive material may be selected from zinc chloride, zinc bromide, potassium hydroxide, ammonia chloride, manganese chloride, a mixture of zinc chloride and ammonia chloride, and mixtures thereof with a weight percentage selected from approximately 25% to 50%. The use of a mixture and also by the weight percentage selection of the water-soluble electroactive material promotes a balanced electrochemical property of the intermediate layer in terms of ionic conductivity, pH and anode gassing suppression.

The intermediate layer also includes a water-soluble viscosity-regulating polymer in an amount sufficient to render the intermediate layer adhesive. The water-soluble viscosity-regulating polymer(s) may serve as a viscosity-regulating agent and secondly as a moisture trapping agent. The intermediate layer may include between approximately 10 wt % to 30 wt % of the water-soluble viscosity-regulating polymer(s). An amount less than 10 wt % will be typically insufficient to regulate the viscosity within the required range. If the value exceeds 30 wt % the viscosity is typically too high and the solution is likely to solidify after a short time due to the entanglement of the polymers in solution.

In some embodiments, the water-soluble viscosity-regulating polymer may be one or more of methyl cellulose, carboxymethyl cellulose, polyvinylpyrrolidone, polyethylene oxide, polyvinyl alcohol, polyurethane, poly(diallyldimethylammonium chloride), and/or polyethylene glycol. When only one water-soluble viscosity-regulating polymer is used, the polymer has a molecular weight higher than $10^4$, to be sufficient to regulate the viscosity within the required range. When a mixture of polymers is used, the first polymer, which is the main water-soluble viscosity-regulating polymer has a molecular weight higher than $10^4$. A second polymer may be added as an agent to aid mixing and to improve the quality of coating on the electrode surfaces. The second polymer has a molecular weight between $10^2$ to $10^4$.

The intermediate layer includes the electroactive material and viscosity-regulating polymer in a water-insoluble polymer matrix having sufficient rigidity to prevent contact of the first layer and the second layer. The water-insoluble polymer matrix is formed by cross linkable precursors dissolved in the intermediate layer solution to form a continuous network, serving as a mechanical support for the intermediate layer. The precursor is selected from poly(ethylene glycol) diacrylate, acrylic acid, trimethylolpropane triacrylate. The precursor is dissolved in a solution of electroactive material and water-soluble polymer with a weight percentage between approximately 5% to 15%. When the amount of precursor dissolved in the solution is below 5%, the resulting water-insoluble polymer matrix has insufficient strength for preventing electrode contact. When the dissolved amount exceeds 15%, a solid film that is too dense is formed, which decreases the electrochemical performance of the intermediate layer.

UV-visible light and photoinitiators are used to initiate the cross-linking process for the cross-linkable precursors. The cross-linking is a fast process, and typically a UV or visible light exposure between 10 and 120 seconds will complete the curing process. The wavelength of the UV or visible light is matched with the wavelength needed to excite the photoinitiator.

Any photoinitiator may be used to make the intermediate layer UV-curable. Alternatively, the photoinitiator may be sensitive to visible light such that the precursor material is curable by visible light. The precursor is used with a UV or visible light photoinitiator with a weight ratio of approximately 100 to 1. Examples of suitable photoinitiators include 2-Methyl-4'-(methylthio)-2-morpholinopropiophenone, 4,4'-Bis(dimethylamino)benzophenone, 2-Hydroxy-2-methylpropiophenone, Benzophenone, 2-Benzyl-2-(dimethylamino)-4'-morpholinobutyrophenone, and 4-Hydroxybenzophenone.

Optionally, the intermediate layer can also contain solid particles which provide further mechanical reinforcement, especially against mechanical shock. Solid particles can be added in an amount of approximately 0.1% to 5%. When the solid particles are added in excess of 5%, the electrochemical performance of the intermediate layer becomes compromised. The solid particle can be selected from a group, or a mixture of glass microspheres, alumina microparticles, and fumed silica particles.

Figure 2:
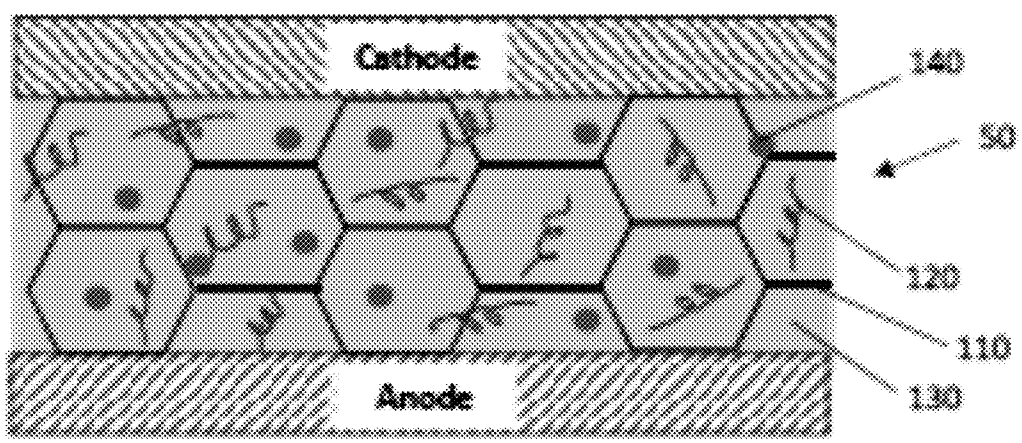
FIG. 2 schematically depicts a cross-section of an intermediate layer for the thin, flexible battery of FIG. 1.

The resultant structure of the intermediate layer 50 is depicted in FIG. 2. The intermediate layer 50 includes the structure of the polymeric network 110 formed by cross-linking the precursor. The electroactive material in water 130 (here represented by the example of a zinc salt dissolved in water) is shown as held within the polymer network 110. The water-soluble polymer 120 is dissolved in the electroactive material/water solution as a viscosity controlling agent. Finally, solid particles 140 are dispersed throughout the electroactive material/water solution that is maintained within the polymeric network 110.

Example 1: Intermediate Layer Fabrication

To form the intermediate layer 50:

1. Dissolve 20% of polyvinyl alcohol (PVA) in de-ionized water. For example, 20 g of PVA into 80 grams of water (total 100 g) to form a PVA-water solution.
2. To the PVA-water solution, $ZnCl_2$ and $MnCl_2$ are added and stirred until clear.
3. After wards, the cross-linkable PEGDA (molecular weight 250, 575, 700) and a second polymer such as polyethylene glycol (PEG) are added to the solution from step 2 and stirred until clear.
4. The photo-initiator is added to solution from step 3 at a ratio of 1:100 of the cross-linkable PEGDA. The mixture is stirred for 5 minutes and ready for use.

Step 1 to 4 is the preparation process for the solution of the intermediate layer.

5. The intermediate layer solution from this preparation procedure typically includes 30% to 50% $ZnCl_2$, 2% to 6% $MnCl_2$, 5% to 10% PEGDA and photo-initiator (ratio of PEGDA to photo-initiator 100:1), 32% to 40% water, 8% to 10% PVA and 3% to 7% PEG.
6. This intermediate layer solution, after curing with UV for 10-30 seconds forms a solid gel.

Example 2: Intermediate Layer Fabrication

To form the intermediate layer 50:

1. In this example, a 20% solution of poly(diallyldimethyl-ammonium chloride) (PDDA) in water purchased from Sigma-Aldrich is used.
2. To the PDDA-water solution, $ZnCl_2$ and $NH_4Cl$ are added and stirred until clear.
3. After wards, the cross-linkable PEGDA and a second polymer, such as PVA or PEG are added to the solution from step 2 and stirred until clear.
4. The photo-initiator is added to solution from step 3 at a ratio of 1:100 of the cross-linkable PEGDA. The mixture is stirred for 5 minutes and ready for use.

Step 1 to 4 is the preparation process for the solution of the intermediate layer.

5. The intermediate layer solution from this preparation procedure typically includes 30% to 50% $ZnCl_2$, 2% to 6% $NH_4Cl$, 5% to 10% PEGDA and photoinitiator (ratio of PEGDA to photoinitiator 100:1), 32% to 40% water, 8% to 10% PDDA and 3% to 7% of the second polymer.
6. This intermediate layer solution after curing with UV for more than approximately 10-30 seconds forms a solid gel.

Example 3: Adhesion Strength Test

A battery structure is adhered between a base plate and a standard 246 g weight and subjected to a vertical lift. From the adhesion test, the estimated adhesion strength of the intermediate layer is 6 kPa.

Figure 3A:
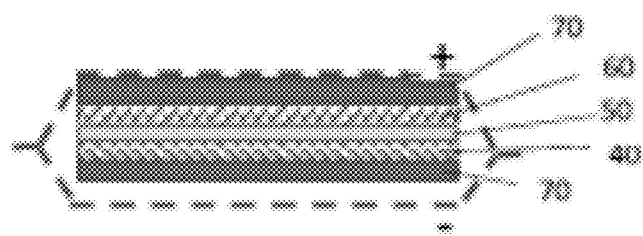
FIGS. 3A, 3B, and 3C schematically depict various cross-sectional views of multi-cell batteries using the intermediate layers of the present invention.
Figure 3B:
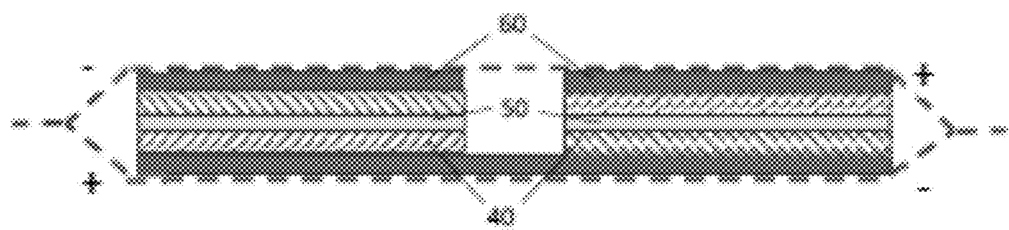
Figure 3C:
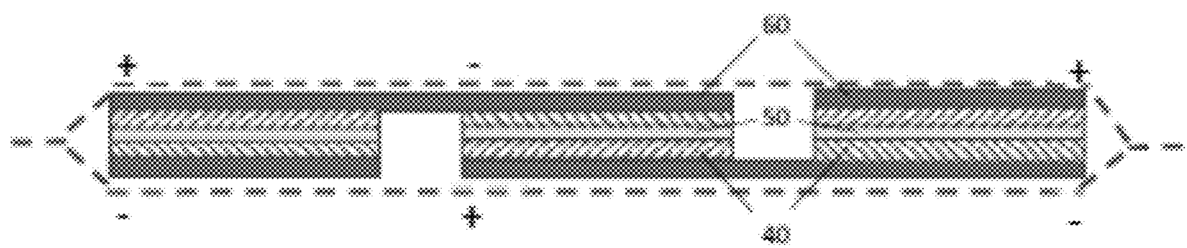

The present invention may be used for form large arrays of cells that have increased voltages compared to individual cells. That is, the voltage of the battery can be custom-designed. FIGS. 3A-3C depict various embodiments of batteries having nominal voltages of 1.5V, 3V, and 4.5 volts employing the intermediate layers of the present invention. FIG. 3A depicts a single-cell 1.5V battery, FIG. 3B depicts a two-cell 3V battery, while FIG. 3C depicts a three-cell 4.5 V battery. Alternatively, large arrays may be printed and then cut into individual batteries.

The present invention has many advantages over the prior art. Bio-friendly materials are employed and no hazardous materials are present, increasing battery safety. By selection and application of green and bio-friendly materials, combined with the safe electrochemistry within the battery itself, there is no risk of large levels of heat generation, explosion, or fire. As a result, the batteries of the present invention may be applied to devices attached to human skin without any safety concerns. Therefore, the batteries of the present invention may be used in health care, skin care, and children's educational products. Further, the bendable and flexible nature of the present battery, along with the ability to custom design electrode and intermediate layer shapes allows it to be integrated with flexible electronics, smart cards, wearable electronics and cosmetic/medical patches.

It should be apparent to those skilled in the art that many modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "includes", "including", "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A thin, bendable, printed, layered primary battery structure without a battery separator, comprising:

a first layer including a printed positive electrode;

a second layer including a negative electrode material, the second layer comprising a printed negative electrode material or a metal foil negative electrode material;

an adhesive, UV-curable electrolyte-containing intermediate layer adhered to the first printed positive electrode layer on a first side of the electrolyte-containing intermediate layer and adhered to the second printed negative electrode layer on a second side of the electrolyte-containing intermediate layer, the adhesive strength of the electrolyte-containing intermediate layer being at least approximately 6 kPa, the intermediate layer comprising:

a water-soluble electroactive material;

a water-soluble viscosity-regulating polymer in an amount sufficient to render the intermediate layer adhesive;

a water-insoluble polymer matrix having sufficient rigidity to prevent contact of the first layer and the second layer;

solid particles in a range of approximately 0.1% to 5%; and a flexible package encasing the first, second, and intermediate layers.

2. The thin, bendable, printed layered, primary battery structure of claim 1, wherein the water-soluble electroactive material is selected from zinc chloride, zinc bromide, potassium hydroxide, manganese chloride, a mixture of zinc chloride and ammonia chloride, and mixtures thereof.

3. The thin, bendable, printed layered primary battery structure of claim 1, wherein the water-soluble viscosity-regulating polymer is selected from methyl cellulose, carboxymethyl cellulose, polyvinylpyrrolidone, polyethylene oxide, polyvinyl alcohol, polyurethane, poly(diallyldimethylammonium chloride), polyethylene glycol, or mixtures thereof.

4. The thin, bendable, printed layered primary battery structure of claim 1, wherein the first layer includes conductive carbon.

5. The thin, bendable, printed layered primary battery structure of claim 4, wherein the conductive carbon is selected from graphene, graphite, carbon black, acetylene black.

6. The thin, bendable, printed layered primary battery structure of claim 1, wherein the first layer includes manganese dioxide powder the second layer includes a zinc-based material.

7. The thin, bendable, printed layered primary battery structure of claim 1, wherein the first layer includes iron oxide powder and the second layer includes nickel-oxide powder.

8. The thin, bendable, printed layered primary battery structure of claim 1, wherein the first layer includes silver-oxide powder and the second layer includes zinc-based material powder.

9. A method of making the thin, bendable, printed layered primary battery structure without a battery separator of claim 1, comprising:

printing the first layer including a positive electrode material on a portion of the flexible package;

printing the electrolyte-containing intermediate layer on the first layer and UV-curing the electrolyte-containing intermediate layer to form a solid electrolyte-containing intermediate layer;

providing the second layer on a portion of the flexible package;

printing a mixture of a water-soluble electroactive material, the water-soluble viscosity-regulating polymer, a photoinitiator, and a precursor material to form the water-insoluble polymer matrix on at least a portion of the first layer and on at least a portion of the second layer;

UV curing the mixture to form an adhesive intermediate layer on each of the first layer and the second layer;

adhering the first layer with the intermediate layer disposed thereon to the second layer with the intermediate layer disposed thereon such that a single intermediate layer is formed and positioned between the first layer and the second layer.

10. The method of claim 9, wherein the photoinitiator is selected from 2-Methyl-4'-(methylthio)-2-morpholinopropiophenone, 4,4'-Bis(dimethylamino)benzophenone, 2-Hydroxy-2-methylpropiophenone, Benzophenone, 2-Benzyl-2-(dimethylamino)-4'-morpholinobutyrophenone, and 4-Hydroxybenzophenone.

11. The method of claim 9, wherein the printing is selected from screen printing, stencil printing, inkjet printing or doctor blade formation.

12. The method of claim 9, further comprising sealing the flexible package.

13. The method of claim 12 wherein the sealing is selected from press sealing, hot sealing, ultrasound welding, or lamination.

* * * * *